US009258374B2

(12) United States Patent
Mankovskii et al.

(10) Patent No.: US 9,258,374 B2
(45) Date of Patent: Feb. 9, 2016

(54) METHOD AND SYSTEM FOR CAPTURING EXPERTISE OF A KNOWLEDGE WORKER IN AN INTEGRATED BREADCRUMB TRAIL OF DATA TRANSACTIONS AND USER INTERACTIONS

(71) Applicant: CA, Inc., Islandia, NY (US)

(72) Inventors: Serge Mankovskii, Santa Clara, CA (US); Maria C. Velez-Rojas, Dublin, CA (US)

(73) Assignee: CA, Inc., New York, NY (US)

( * ) Notice: Subject to any disclaimer, the term of this patent is extended or adjusted under 35 U.S.C. 154(b) by 462 days.

(21) Appl. No.: 13/690,406

(22) Filed: Nov. 30, 2012

(65) Prior Publication Data

US 2014/0156827 A1 Jun. 5, 2014

(51) Int. Cl.
*G06F 15/16* (2006.01)
*H04L 29/08* (2006.01)
*G06Q 10/06* (2012.01)

(52) U.S. Cl.
CPC ............ *H04L 67/22* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 5,860,918 | A * | 1/1999 | Schradi et al. | 600/300 |
| 6,829,608 | B2 * | 12/2004 | Ma et al. | 707/776 |
| 6,907,426 | B2 * | 6/2005 | Hellerstein et al. | |
| 7,512,624 | B2 * | 3/2009 | Ankerst | 345/441 |
| 7,663,626 | B2 * | 2/2010 | Rexroad et al. | 345/440 |
| 7,894,419 | B2 * | 2/2011 | Turpin et al. | 370/351 |
| 7,999,810 | B1 * | 8/2011 | Boice et al. | 345/473 |
| 8,291,075 | B1 * | 10/2012 | Patel | 709/224 |
| 8,583,586 | B2 * | 11/2013 | Ebadollahi et al. | 706/53 |
| 8,938,532 | B2 * | 1/2015 | Terrell et al. | 709/224 |
| 2005/0177540 | A1 * | 8/2005 | Ankerst et al. | 707/1 |
| 2008/0125666 | A1 * | 5/2008 | Crozier et al. | 600/509 |
| 2010/0104196 | A1 * | 4/2010 | Paez et al. | 382/195 |
| 2012/0072583 | A1 * | 3/2012 | Kupferman et al. | 709/224 |
| 2013/0316313 | A1 * | 11/2013 | Darrow | 434/236 |
| 2014/0006938 | A1 * | 1/2014 | Black et al. | 715/255 |

* cited by examiner

*Primary Examiner* — Shirley Zhang
(74) *Attorney, Agent, or Firm* — Myers Bigel Sibley & Sajovec, P.A.

(57) ABSTRACT

A system and method is provided for creating a trail of events. A plurality of data exchange events and a plurality of user interaction events are captured. A frame is generated based on the captured plurality of user interaction events. A cut is generated based on the captured plurality of data exchange events and the frame. The cut represents a historical trail of the plurality of user interaction events associated with the back-end data receive event and the back-end data send event.

20 Claims, 3 Drawing Sheets

METHOD AND SYSTEM FOR CAPTURING EXPERTISE OF A KNOWLEDGE WORKER IN AN INTEGRATED BREADCRUMB TRAIL OF DATA TRANSACTIONS AND USER INTERACTIONS

TECHNICAL FIELD

The present disclosure relates to the field of information technology (IT) management systems. More particularly, the present disclosure relates to capturing events associated with the IT management systems.

BACKGROUND

Modern information technology (IT) management systems allow users to interact with large amounts of data through user interfaces and visualizations. These tools facilitate complex data exchanges with back-end storage systems as well as interactively explore the received data. While such interfaces provide many benefits, it remains a challenge for users to explore and analyze the history of their activities.

Breadcrumbs or breadcrumb trail in IT management systems provide information to users regarding how they arrived at a current state of their IT environment. In other words, a breadcrumb trail is a trail or history of activities or events associated with the IT environment that the user is interacting with. To accurately analyze the information provided by the breadcrumb trail, users need to know contextual information including, but not limited to: i) the initial state of the IT environment they were working with; ii) the actions they performed and the results obtained, and iii) data that was visible on their screen at the time they decided to perform modifications to the IT environment. Often systems provide logs of data transactions or interface events, and users rely on memory to determine the contextual information that led to such actions. The dynamic nature of IT environments makes it difficult for users to have a clear picture of actual information they used in their decision making process.

An alternative to logging user activities is using breadcrumb trails of static snapshots of the interface with which the user interacts. Snapshots may be captured and labeled by the users. However, both approaches fail to capture contextual information that helps reconstruct the data and human factors that influenced user actions.

As such, there is a need for a breadcrumb trail navigation tool that integrates and structures data exchanges with user interaction events such that users may trace the factors that influenced critical decisions and to trace back events that may have been sources of error.

These and other drawbacks exist.

SUMMARY

Various systems, computer program products, and methods for creating a trail of events are described herein.

According to various implementations of the present disclosure, the method may include a plurality of operations. In some implementations, the operations may include capturing a plurality of data exchange events and a plurality of user interaction events, wherein each data exchange event is representative of a communication with a back-end data system, and wherein each user interaction event is representative of a user interaction with a local system remote from the back-end data system. In some implementations, the operations may include generating a frame based on the plurality of user interaction events in response to said capturing, wherein the frame comprises at least one of the plurality of user interaction events. In some implementations, the operations may include generating a cut based on the plurality of data exchange events, wherein the cut comprises the frame, a back-end data receive event included within the plurality of data exchange events, and a back-end data send event included within the plurality of data exchange events, wherein the back-end data receive event precedes the frame in time and wherein the back-end data send event succeeds the frame in time. The cut may represent a historical trail of the plurality of user interaction events associated with the back-end data receive event and the back-end data send event.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
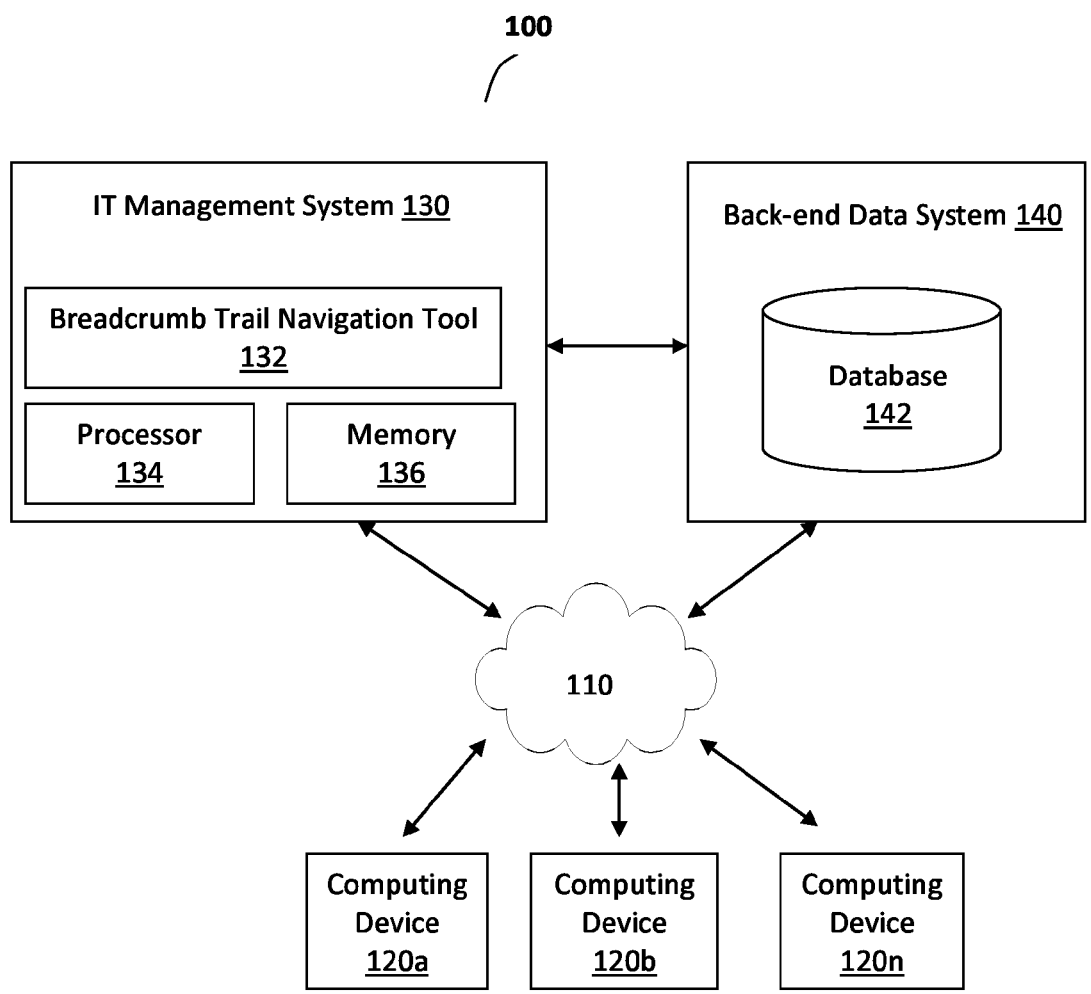
FIG. 1 illustrates an example system for creating a trail of events, according to various aspects of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing Computer program code for carrying out operations for aspects of the present disclosure may be written in any combination of one or more programming languages, including an object oriented programming language such as Java, Scala, Smalltalk, Eiffel, JADE, Emerald, C++, CU, VB. NET, Python or the like, conventional procedural programming languages, such as the "C" programming language, Visual Basic, Fortran 2003, Perl, COBOL 2002, PHP, ASAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an example illustration of system 100, according to an aspect of the present disclosure. System 100 may include, among other things, an information technology (IT) management system 130 that is configured to manage one or more technology resources associated with an enterprise. In some implementations, the technology resources may include resources such as computer hardware, software, data storage systems, services, networks, files, or documents. In some implementations, hardware resources may include printers, workstations (such as, PC, notebook, etc.), and/or other hardware resources. In some implementations, storage resources may include active storage systems, passive storage systems, network cards, and/or other storage resources. In some implementations, network resources may include switches, firewalls, routers, subnets, racks, external network service provider resources, and/or other network resources. In some implementations, software resources may include operative systems, virtual machines, and/or other software resources. In some implementations, services resources may include email service, and/or other services resources.

IT management system 130 may include, among other components, breadcrumb trail navigation tool 132. Breadcrumb trail navigation tool 132 may be configured to create a breadcrumb trail (i.e., historical trail) of one or more activities/events. IT management system 130 may be communicatively coupled to database 140. IT management system 130 may be communicatively coupled to a computing device 120 (illustrated in FIG. 1 as a plurality of computing devices 120a . . . 120n). IT management system 130 may be coupled to computing device 120 via a network 110. Network 110 may include a Local Area Network, a Wide Area Network, a cellular communications network, a Public Switched Telephone Network, and/or other network or combination of networks.

In some implementations, IT management system 130 may include a processor 134, a memory 136, and/or other components that facilitate the functions of IT management system 130/breadcrumb trail navigation tool 132. In some implementations, processor 134 includes one or more processors configured to perform various functions of IT management system 130/breadcrumb trail navigation tool 132. In some implementations, memory 136 includes one or more tangible (i.e., non-transitory) computer readable media. Memory 136 may include one or more instructions that when executed by processor 134 configure processor 134 to perform functions of IT management system 130/breadcrumb trail navigation tool 132. In some implementations, memory 136 may include one or more instructions stored on tangible computer readable media that when executed at a remote device, such as computing device 120, cause the remote device to view, retrieve, edit, or capture information, and/or otherwise interact or communicate with IT management system 130/breadcrumb trail navigation tool 132, as described herein.

In some implementations, breadcrumb trail navigation tool 132 (referred to hereinafter as "tool 132") may capture a plurality of data exchange events. In some implementations, each data exchange event may be representative of a communication with back-end data system 140 (for example, data requests to back-end data system 140). In some implementations, data exchange (i.e., transfer of data) may take place between back-end data system 140 and a local system remote from back-end data system 140 (for example, computing device 120). In some implementations, a data exchange event may include receipt of data at the local system from back-end data system 140, transmission of data from the local system to back-end data system 140, and/or other data exchange between the local system and back-end data system 140. In some implementations, local system may receive data from the back-end data system 140 in response to a data request (from local system to back-end data system 140).

In some implementations, tool 132 may capture a plurality of data manipulation events. In some implementations, a data manipulation event may include an event associated with manipulation of data at the local system such as, for example, computing device 120. In some implementations, the data manipulation event may include a read event, a write event, a data modification event, and/or other event that access or otherwise creates data. In some implementations, data received from the back-end data system 140 may be manipulated/modified at the local system. In some implementations, the manipulated/modified data may be sent back to the back-end data system 140 during a data exchange event.

In some implementations, a data manipulation event may include an event associated with one or more filters applied to data locally stored by an application (not otherwise illustrated in FIG. 1) running on the local system. In some implementations, a data manipulation event may include an event associated with one or more processes (such as root-case and impact analysis, or other processes) applied to data locally stored by an application (not otherwise illustrated in FIG. 1) running on the local system.

In some implementations, tool 132 may capture a plurality of user interaction events. In some implementations, each user interaction event may be representative of a user interaction with the local system. In some implementations, user interaction events may include one or more events associated with user actions performed at the local system. In some implementations, user interaction events may include an event associated with user messages generated by an application (not otherwise illustrated in FIG. 1) running on the local system. In some implementations, user interaction events may include an event associated with snapshots of information visible to a user in a screen. In some implementations, snapshots of the screen (e.g., a time series of snapshots) may be automatically generated and captured when an event results in a change in the structure of the IT environment. In some implementations, a user action may lead to changes in the configuration parameters/configuration state associated with the IT environment (i.e., changes in the configuration, properties, and/or dependencies/connections associated with the resources managed by the IT management system 130). In some implementations, events associated with such user action and snapshots of information visible to the user in response to such user action may be captured.

In some implementations, the plurality of user interaction events may include a mouse event (such as, for example, mouse tracks, mouse clicks, scrolls, or other event), a mouse position event, a keyboard event (such as, for example, keyboard entry, or other event), a snapshot event, an eye tracking event (such as, for example, eye fixations captured by an eye-tracker device which may be part of the local system or external to but coupled to the local system), a user annotation event (such as, for example, images, voice, or text), a user recording event (such as, for example, audio or video captured by audio or video recorders which may be part of the local system or external to but coupled to the local system), and/or other user interaction events associated with the local system and/or with external devices coupled to the local system. In some implementations, user interaction events such as mouse position and eye tracking may be captured at a constant rate (i.e., at regular intervals of time).

In some implementations, events such as user annotations and snapshots may be captured at a non-constant rate. For example, a user annotation event may be captured when a user enters any text (or other) annotations. A snapshot event (including a screen snapshot) may be automatically captured when a user performs a save operation or may otherwise be triggered by the user at particular times. In some implementations, a snapshot may be captured at the moment of receipt of data from the back-end data system 140 (i.e., the snapshot may represent what information the user is looking at on the screen when data is received from the back-end data system 140). In some implementations, a snapshot may be captured at the moment when data is sent back to the back-end data system 140 (i.e., the snapshot may represent what information the user is looking at on the screen when data is sent back to the back-end data system 140). In some implementations, one or more snapshots may be captured between the data receive and data send exchange events. In some implementations, a set of snapshots may be manually added by the user. In some implementations, the snapshots may be annotated by the user at the moment of creation.

In some implementations, tool 132 may generate a frame based on the captured plurality of user interaction events. In some implementations, the frame may include at least one of the plurality of user interaction events. In some implementations, the frame may include at least some of the plurality of user interaction events over a particular time interval. For example, a new frame may be generated automatically every one second and may include at least some of the plurality of user interaction events captured during the associated one second. In some implementations, the particular time interval may be 30 seconds (i.e., a new frame is generated every 30 seconds). In some implementations, the particular time interval may be configurable.

In some implementations, tool 132 may generate a cut based on the captured plurality of data exchange events and the frame. In some implementations, tool 132 may generate the cut based on the captured plurality of data exchange events, the captured plurality of data manipulation events, and the frame.

In some implementations, the cut may include the frame, start with a back-end data receive event (i.e., data exchange event associated with receiving data from the back-end data system at the local system), and end with a back-end data send event (i.e., data exchange event associated with transmitting data from local system to the back-end data system). In some implementations, the cut may include information such as events (including data) related to data received from the back-end, events (including data) related to data modification/manipulation by the user within the cut, events (including data) related to data sent to the back-end, and/or other information.

In some implementations, the cut may represent a historical trail of the plurality of user interaction events associated with the back-end data receive event and the back-end data send event. In some implementations, the cut may include the plurality of user interaction events associated with the back-end data receive event and the back-end data send event.

Figure 2:
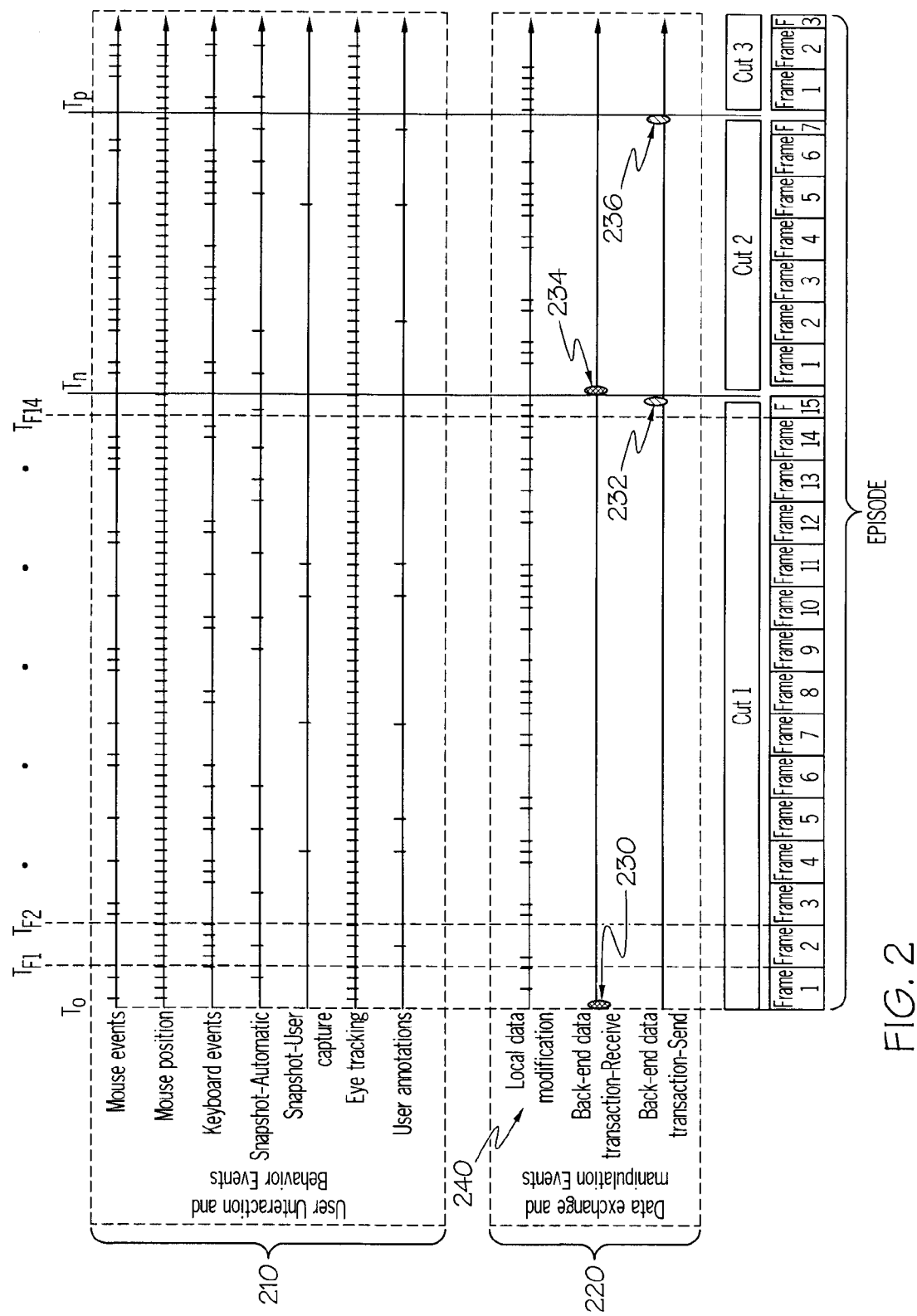
FIG. 2 illustrates example events captured by a breadcrumb trail navigation tool, according to various aspects of the present disclosure.

FIG. 2 illustrates example events captured by tool 132, according to various aspects of the present disclosure. As illustrated, various user interaction and behavior events 210 and data exchange and manipulation events 220 may be captured and integrated in a timeline starting at $T_0$. Referring to FIG. 2, Cut 1 may start with a back-end data receive transaction/event 230 at time $T_0$ and may end with a back-end data send transaction/event 232 at time $T_n$. Similarly, Cut 2 may start with a back-end data receive transaction/event 234 at time $T_n$ and may end with a back-end data send transaction/event 236 at time $T_p$.

In some implementations, Cut 1, for example, may include the back-end data receive event 230 and data associated therewith, one or more data manipulation/modification events 240 occurring at the local system from time $T_0$ to $T_n$, and/or the back-end data send event 232 and data associated therewith.

In some implementations, a cut may be divided into frames that group user interaction and behavior events 210 in constant time intervals. For example, Cut 1 may include fifteen frames (illustrated as frames 1 to 15) that cover the time period from $T_0$ to $T_n$. In some implementations, a frame may include at least one or a subset of the plurality of user interaction and behavior events 210 over a particular time interval. For example, each frame (frame 1, frame 2, . . . , frame 15) associated with Cut 1 may be generated after a particular time interval. In other words, each frame covers a particular time interval, for example, frame 1 covers the time interval from time $T_0$ to $T_{F1}$, frame 2 covers the time interval from time $T_{F1}$ to $T_{F2}$, and so on. Each frame may include at least some of the plurality of user interaction events captured during its associated time interval. For example, frame 1 may include user interaction and behavior events occurring from time $T_0$ to $T_{F1}$, frame 2 may include user interaction and behavior events occurring from time $T_{F1}$ to $T_{F2}$, and so on.

In some implementations, a cut may represent a trail of the plurality of user interaction events associated with a back-end data receive event and a back-end data send event. For example, Cut 1 may represent a trail of user interaction and behavior events associated with back-end data receive event 230 and a back-end data send event 232.

In some implementations, a cut may represent a trail of user interaction and behavior events 210 and data manipulation/modification events 240 associated with a back-end data receive event and a back-end data send event. For example, when a back-end data receive event 230 occurs (i.e., when a local system receives data from a back-end data system) at time $T_0$ tool 132 captures various data manipulation/modification events until a back-end data send event occurs at time $T_n$. Tool 132 may also capture various user interaction and behavior events between time $T_0$ and $T_n$. In this manner, tool 132 may capture various data manipulation/modification events, user interaction events, and/or behavior events after a back-end data receive event occurs until a back-end data send event occurs.

In some implementations, the breadcrumb trail generated by tool 132 may include frames and cuts. Tool 132 may store a copy of the current configuration state of resources managed by the IT management system 130 with a first event (for example, back-end data receive event 230) and continue storing event information for subsequent events by structuring the event information into cuts and frames. This information may enable capturing evolution of the state of the IT environment (i.e., configuration state of the managed resources) so that it may be reconstructed at a later time by "re-playing" this stored information. In some implementations, tool 132 may store the information in database 142 or a separate database (not otherwise illustrated in FIG. 1) coupled to IT Management System 130.

In some implementations, tool 132 may generate an episode. In some implementations, the episode may include at least two cuts. An episode may represent a unit of user activity (such as resolution of a problem, or performance of a task) that may include several cuts. For example, FIG. 2 illustrates an Episode that includes three cuts: Cut 1, Cut 2, and Cut 3. In some implementations, each cut may be associated with a single user (for example, Cut 1 may be associated with a first user, Cut 2 may be associated with a second user, and Cut 3 may be associated with a third user). In other words, Cut 1 may include one or more data manipulation events and one or more user interaction and behavior events associated with a first user, Cut 2 may include one or more data manipulation events and one or more user interaction and behavior events associated with a second user, and Cut 3 may include one or more data manipulation events and one or more user interaction and behavior events associated with a third user. In some implementations, a single cut may be associated with more than one user. In some implementations, more than one cut may be associated with a single user.

In some implementations, each episode may include actors (i.e., users) involved in the episode. An actor may be assigned to the episode if the actor has read, written, modified, and/or manipulated any data within any cut associated with the episode. For example, an actor may be assigned to the Episode illustrated in FIG. 2 if he/she has manipulated the data within any of the Cuts 1, 2, or 3. In some implementations, the assignment may be made based on a role and/or identifier (user id) associated to the actor manipulating the data.

For example, an episode may represent a server maintenance task. Several people may be involved in the task, each person performing a portion of the task (i.e., sub-task) assigned to him. For instance, a first person may be assigned with a first sub-task of reviewing audit logs generated by the server, a second person may be assigned with a second sub-task of monitoring server performance, and so on. A first cut associated with the episode may include one or more data manipulation events and one or more user interaction and behavior events performed by the first person while conducting the first sub-task. A second cut associated with the episode may include one or more data manipulation events and one or more user interaction and behavior events performed by the second person conducting the second sub-task.

In some implementations, the first person and second person may perform their respective sub-tasks substantially simultaneously. In this case, the cut/frame(s) associated with the first person and the cut/frame(s) associated with the second person may be generated substantially simultaneously.

In some implementations, data generated/manipulated by a first person to complete his sub-task may be needed by a second person to complete his sub-task. In this case, the cut/frame(s) associated with the first person may be generated when the first person completes his sub-task (prior to the generation of the cut/frame(s) associated with the second person) and the cut/frame(s) associated with the second person may be generated when the second person completes his sub-task (after the generation of the cut/frame(s) associated with the second person).

In some implementations, an episode may be generated substantially simultaneously with the collection of cuts and frames. In some implementations, the episode may be generated at a later time by using methods such as, but not limited to, machine learning, data miming, data warehousing, manual composition, and/or other methods.

In some implementations, an episode may include a state machine of cuts (or "cut state machine"). In some implementations, a cut state machine may be generated for each actor. In some implementations, the cut state machine may capture manipulation by the actor such as, backward and forward movement as well as switching tabs, applications or windows with different data elements. A list of state machines may be generated for all actors involved in the episode.

In some implementations, the breadcrumb trail (including frames, cuts, episodes, and events, data, and/or actors associated therewith, time associated with the captured events, or generation of frames, cuts, episodes, and/or other captured/generated information) generated by tool 132 may be stored in database 142 or a separate database (not otherwise illustrated in FIG. 1). In some implementations, the time information associated with the events, frames, cuts, episodes, etc. may be based on a local clock of the local system (for example, computing device 120).

In some implementations, the breadcrumb trail may be stored using a graph database that captures relationships among actors and cut state machines. In some implementation, the breadcrumb trail may be stored using a combination of the graph database and write-once-read-many-times data store.

In some implementations, the breadcrumb trail may be used to reconstruct a prior state of the IT environment. In some implementations, tool 132 may perform the reconstruction of the prior state. For example, if information regarding a prior state at a particular time (say $T_{F2}$) is desired, the information stored by tool 132 may be used to determine, the episode, cut and/or frame associated with time $T_{F2}$. For example, tool 132 may determine that cut 1 and frame 2 are associated with time $T_{F2}$. All the event information captured until time $T_{F2}$ is retrieved by the database (i.e., from time $T_0$ to time $T_{F2}$). Based on the retrieved information, the prior state may be reconstructed. In some implementations, the actor associated with the cut 1 may also be determined, thereby indicating the person associated with the various events (based on the graph database, for example). In some implementations, tool 132 may generate a display of the reconstructed state.

Users such system administrators, among others, may interact with IT management system 130/tool 132 via computing device 120. In some implementations, computing device 120 may include a computing/processing device such as a desktop computer, a laptop computer, a network computer, a wireless phone, a personal digital assistant, a tablet computing device, workstation, and/or other computing devices that may be utilized to interact with IT management system 130/tool 132. In some implementations, computing device 120 may comprise a user interface (not otherwise illustrated in FIG. 1) that allows users to perform various operations that may facilitate interaction with IT management system 130/tool 132 including, for example, providing requests to retrieve information associated with events, reconstruct a prior state, provide inputs associated with the events, display results, and/or performing other operations. Computing device 120 may include a processor (not otherwise illustrated in FIG. 1), circuitry, and/or other hardware operable to execute computer-readable instructions.

In some implementations, a user may request information regarding one or more events or request to reconstruct a prior state. In some implementations, the request may include a time or time range, resource identifiers (associated with the managed resources), user identifiers, user roles, and/or other attributes that may be used to retrieve event information. In some implementations, tool 132 may retrieve the event information and/or reconstruct the prior state based on the user request (i.e., attributes in the user request) and present the results to the user. User may view the results via computing device 120, for example.

Figure 3:
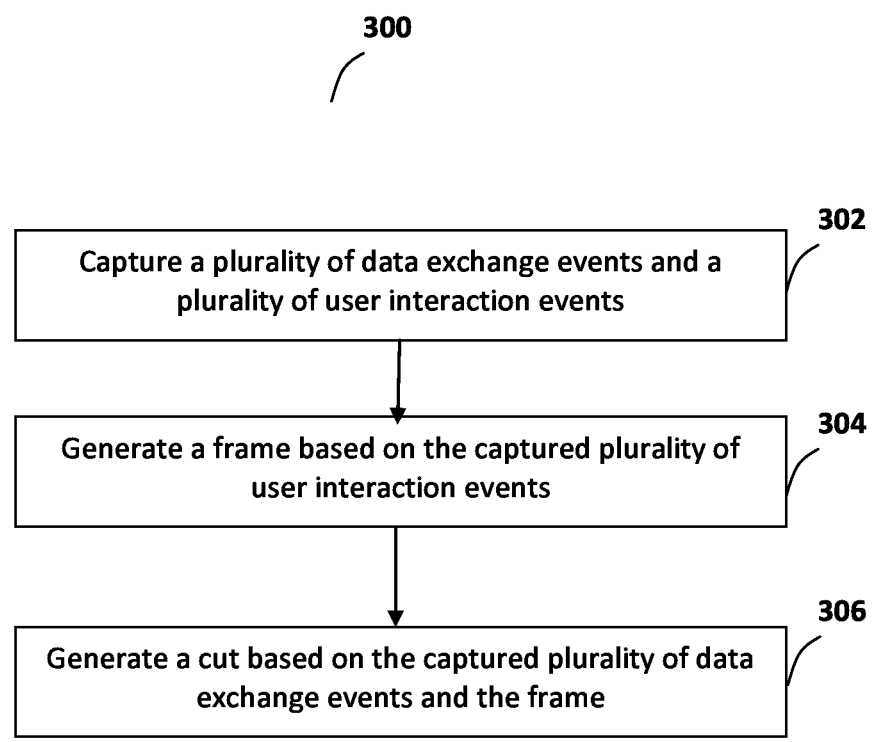
FIG. 3 is a flowchart depicting example operations performed by breadcrumb trail navigation tool, according to various aspects of the present disclosure.

FIG. 3 is a flowchart 300 depicting example operations performed by IT management system 130/breadcrumb trail navigation tool 132 to create a trail of events, according to various aspects of the present disclosure. In some implementations, the described operations may be accomplished using one or more of the modules/components described herein. In some implementations, various operations may be performed in different sequences. In other implementations, additional operations may be performed along with some or all of the operations shown in FIG. 3. In yet other implementations, one or more operations may be performed simultaneously. In yet other implementations, one or more operations may not be performed. Accordingly, the operations described should not be viewed as limiting.

In an operation 302, process 300 may capture a plurality of data exchange events and a plurality of user interaction events. In some implementations, each data exchange event may be representative of a communication with a back-end data system. In some implementations, each user interaction event may be representative of a user interaction with a local system remote from the back-end data system.

In an operation 304, process 300 may generate a frame based on the captured plurality of user interaction events. In some implementations, the frame may include at least one of the plurality of user interaction events. In some implementations, the user interaction events may include, but not be limited to, a mouse event, a mouse position event, a keyboard event, a snapshot capture event, an eye tracking event, or a user annotation event.

In an operation 306, process 300 may generate a cut based on the captured plurality of data exchange events and the frame. In some implementations, the cut may include the frame and starts with a back-end data receive event included within the plurality of data exchange events and ends with a back-end data send event included within the plurality of data exchange events.

In some implementations, the cut comprises the frame, a back-end data receive event included within the plurality of data exchange events, and a back-end data send event included within the plurality of data exchange events, wherein the back-end data receive event precedes the frame in time and wherein the back-end data send event succeeds the frame in time. In some implementations, the cut comprises the frame, a single back-end data receive event included within the plurality of data exchange events, and a single back-end data send event included within the plurality of data exchange events.

In some implementations, the cut may represent a historical trail of the plurality of user interaction events associated with the back-end data receive event and the back-end data send event.

In some implementations, process 300 may generate an episode comprising a plurality of data manipulation events associated with a first user and a second user. In some implementations, the episode may include a first cut and a second cut. In some implementations, the first cut may include one or more data manipulation events associated with the first user and the second cut may include one or more data manipulation events associated with the second user.

In some implementations, the breadcrumb trail allows users to trace factors that influenced certain decisions and trace back events that may have been sources of error. The breadcrumb trail preserves user actions and user experience in relation to data and time thus enabling rich media for capturing user expertise, knowledge, and decision-making process. The breadcrumb trail may be used as a knowledge worker tool for the following, but not limited to, purposes: new user training, new user assistance, expertise recording, user study, quality assurance, compliance, case based reasoning, expert system, security, or collaborative problem solving. The breadcrumbs may be played back in fast or slow tempo by varying time intervals between presentations of consecutive frames. Temporal information preserved in the frame may enable insight into usability of user interfaces.

Implementations of the present disclosure may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the present disclosure.

Other embodiments, uses and advantages of the present disclosure will be apparent to those skilled in the art from consideration of the specification and practice of the present disclosure disclosed herein. The scope of the present disclosure is accordingly intended to be determined solely by the appended claims.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    capturing, and storing in a data repository, a plurality of data exchange events and a plurality of user interaction events, wherein each data exchange event is representative of a communication between a back-end data system and a local computing system that is remote from the back-end data system over a computer network, and wherein each user interaction event comprises an action performed by a user at the local computing system that is remote from the back-end data system;
    generating a frame based on the plurality of user interaction events stored in the data repository in response to said capturing, wherein the frame comprises user interaction events included within the plurality of user interaction events captured over a time interval; and
    generating a cut based on the plurality of data exchange events stored in the data repository, wherein the cut comprises the frame, a back-end data receive event included within the plurality of data exchange events, and a back-end data send event included within the plurality of data exchange events,
    wherein the back-end data receive event is a data exchange event associated with receiving data over the computer network from the back-end data system at the local computing system,
    wherein the back-end data send event is a data exchange event associated with transmitting data over the computer network from the local computing system to the back-end data system,
    wherein the back-end data receive event represents a beginning of the cut and precedes the frame in time,
    wherein the back-end data send event represents an end of the cut and succeeds the frame in time, and
    wherein the cut represents a historical trail of the plurality of user interaction events associated with the back-end data receive event and the back-end data send event.

2. The method of claim 1, wherein the plurality of user interaction events comprise a snapshot capture event.

3. The method of claim 1, wherein capturing a plurality of user interaction events comprises capturing the plurality of user interaction events at a constant rate.

4. The method of claim 1, wherein capturing a plurality of user interaction events comprises capturing the plurality of user interaction events at a non-constant rate.

5. The method of claim 1, further comprising:
    generating an episode comprising a plurality of data manipulation events associated with a first user and a second user.

6. The method of claim 5, wherein the episode comprises a first cut and a second cut,
    wherein the first cut comprises a data manipulation event associated with the first user, and
    wherein the second cut comprises a data manipulation event associated with the second user.

7. The method of claim 5, wherein the plurality of data manipulation events comprise a data modification event.

8. The method of claim 1, wherein the cut comprises the frame, a single back-end data receive event included within the plurality of data exchange events, and a single back-end data send event included within the plurality of data exchange events.

9. A system comprising:
    a processor;
    a data repository coupled to the processor; and
    a memory coupled to the processor and comprising computer readable program code embodied in the memory that when executed by the processor causes the processor to perform operations comprising:
        capturing, and storing in the data repository, a plurality of data exchange events and a plurality of user interaction events, wherein each data exchange event is representative of a communication between a back-end data system and a local computing system that is remote from the back-end data system over a computer network, and wherein each user interaction event comprises an action performed by a user at the local computing system that is remote from the back-end data system;

generating a frame based on the plurality of user interaction events stored in the data repository, wherein the frame comprises user interaction events included within the plurality of user interaction events captured over a time interval; and generating a cut based on the plurality of data exchange events stored in the data repository, wherein the cut comprises the frame, a back-end data receive event included within the plurality of data exchange events, and a back-end data send event included within the plurality of data exchange events, wherein the back-end data receive event is a data exchange event associated with receiving data over the computer network from the back-end data system at the local computing system, wherein the back-end data send event is a data exchange event associated with transmitting data over the computer network from the local computing system to the back-end data system, wherein the back-end data receive event represents a beginning of the cut and precedes the frame in time, wherein the back-end data send event represents an end of the cut and succeeds the frame in time, and wherein the cut represents a historical trail of the plurality of user interaction events associated with the back-end data receive event and the back-end data send event.

10. The system of claim 9, wherein the plurality of user interaction events comprise a user annotation event.

11. The system of claim 9, wherein the processor:
generates an episode, the episode comprising a plurality of data manipulation events associated with a first user and a second user.

12. The system of claim 11, wherein the episode comprises a first cut and a second cut,
wherein the first cut comprises a data manipulation event associated with the first user, and
wherein the second cut comprises a data manipulation event associated with the second user.

13. The system of claim 11, wherein the plurality of data manipulation events comprises a data modification event.

14. The system of claim 9, wherein the cut comprises the frame, a single back-end data receive event included within the plurality of data exchange events, and a single back-end data send event included within the plurality of data exchange events.

15. A computer program product comprising:
a non-transitory computer-readable storage medium having computer readable program code embodied therewith, the computer readable program code comprising:
a computer readable program code to capture, and store in a data repository, a plurality of data exchange events and a plurality of user interaction events,
wherein each data exchange event is representative of a communication between a back-end data system and a local computing system that is remote from the back-end data system over a computer network, and
wherein each user interaction event is comprises an action performed by a user at the local computing system that is remote from the back-end data system;

a computer readable program code to generate a frame based on the plurality of user interaction events stored in the data repository,
wherein the frame comprises user interaction events included within the plurality of user interaction events captured over a time interval; and a computer readable program code to generate a cut based on the plurality of data exchange events stored in the data repository, wherein the cut comprises the frame, a back-end data receive event included within the plurality of data exchange events, and a back-end data send event included within the plurality of data exchange events, wherein the back-end data receive event is a data exchange event associated with receiving data over the computer network from the back-end data system at the local computing system, wherein the back-end data send event is a data exchange event associated with transmitting data over the computer network from the local computing system to the back-end data system, wherein the back-end data receive event represents a beginning of the cut and precedes the frame in time, wherein the back-end data send event represents an end of the cut and succeeds the frame in time, and wherein the cut represents a historical trail of the plurality of user interaction events associated with the back-end data receive event and the back-end data send event.

16. The computer program product of claim 15, wherein the plurality of user interaction events comprise an eye tracking event.

17. The computer program product of claim 15, wherein the computer program product further comprises:
computer readable program code to generate an episode, the episode comprising a plurality of data manipulation events associated with a first user and a second user.

18. The computer program product of claim 17, wherein the episode comprises a first cut and a second cut,
wherein the first cut comprises a data manipulation event associated with the first user, and
wherein the second cut comprises a data manipulation event associated with the second user.

19. The computer program product of claim 17, wherein the plurality of data manipulation events comprises a data modification event.

20. The computer program product of claim 15, wherein the cut comprises the frame, a single back-end data receive event included within the plurality of data exchange events, and a single back-end data send event included within the plurality of data exchange events.

* * * * *